United States Patent
Müller

(10) Patent No.: US 6,223,135 B1
(45) Date of Patent: Apr. 24, 2001

(54) METHOD AND DEVICE FOR DETERMINING A VARIABLE DESCRIBING THE SPEED OF A VEHICLE

(75) Inventor: Elmar Müller, Markgroeiningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/194,249
(22) PCT Filed: Feb. 14, 1998
(86) PCT No.: PCT/DE98/00427
  § 371 Date: Nov. 25, 1998
  § 102(e) Date: Nov. 25, 1998
(87) PCT Pub. No.: WO98/43859
  PCT Pub. Date: Oct. 5, 1998

(30) Foreign Application Priority Data

Mar. 29, 1997 (DE) .............................................. 197 13 253

(51) Int. Cl.⁷ ....................................................... G01P 3/00
(52) U.S. Cl. ............................................ 702/148; 702/145
(58) Field of Search ...................................... 73/1, 37, 468, 73/12; 364/426.02; 307/10.1; 188/180; 361/236; 192/140; 116/57, 623, 74; 303/96, 97, 100, 111

(56) References Cited

U.S. PATENT DOCUMENTS 4,989,923 * 2/1991 Lee et al. ........................... 303/109
5,272,634 * 12/1993 Leibbrand et al. ............. 364/426.02
5,364,174 * 11/1994 Becker et al. ........................ 303/97

FOREIGN PATENT DOCUMENTS 38 33 212 * 4/1990 (DE).
40 09 195 * 9/1991 (DE).

OTHER PUBLICATIONS

* Von Anton van Zanten et al., "FDR—die Fahrdynamikregelung von Bosch" [FDR—the Bosch vehicle dynamics control system], Automobiltechnische Zeitschrift (ATZ) 96, 1994, vol. 11, pp. 674–89.
Von Anton van Zanten et al., "FDR—die Fahrdynamikregelung von Bosch".*

* cited by examiner

Primary Examiner—Marc S. Hoff
Assistant Examiner—Edward Raymond
(74) Attorney, Agent, or Firm—Kenyon & Kenyon

(57) ABSTRACT

A method and an apparatus are provided for determining a variable describing the speed of a vehicle. The variable describing the speed of the vehicle is determined as a function of the speed of a selected wheel. For this purpose, on the basis of the wheel speeds at least a first and a second plausibility query are performed, the results of which are taken into consideration in the selection of the wheel. On the basis of the first plausibility query it is ascertained whether the variable describing the speed of the vehicle can be determined as a function of a wheel whose wheel speed is greater than the variable describing the speed of the vehicle. On the basis of the second plausibility query it is ascertained whether the variable describing the speed of the vehicle can be determined as a function of a wheel whose wheel speed is less than the variable describing the speed of the vehicle.

12 Claims, 5 Drawing Sheets

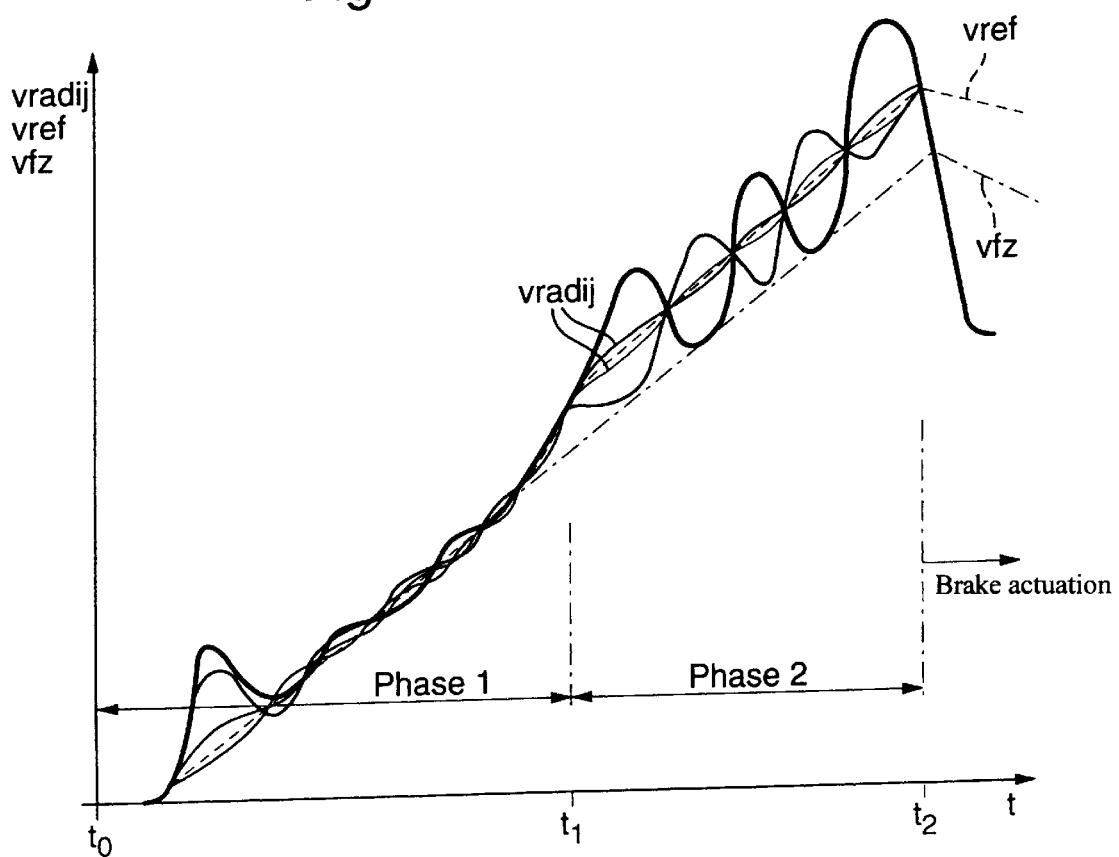

METHOD AND DEVICE FOR DETERMINING A VARIABLE DESCRIBING THE SPEED OF A VEHICLE

FIELD OF THE INVENTION

The present invention concerns a method and an apparatus for determining a variable describing vehicle speed.

BACKGROUND INFORMATION

Many methods and apparatuses for determining a variable describing vehicle speed are known from the existing references in many modifications.

German Patent Publication No. 38 33 212 (which corresponds to U.S. Pat. No. 5,272,634).

German Offenlegungsschrift 38 33 212 (U.S. Pat. No. 5,272,634) describes, for a vehicle driven at a single axle and equipped with an antilock braking control system, the creation of a reference variable for the vehicle speed outside the braking pressure control system. This is done essentially by determining an averaged wheel speed on the basis of the speeds of the two driven wheels. If the derivative over time of this averaged wheel speed is greater than zero, the reference variable is defined by the speed of the slower of the two driven wheels. If the derivative over time of this averaged wheel speed is less than zero, the reference variable is then defined by the speed of the faster of the two driven wheels. The slope of the reference variable for the vehicle speed is thus limited to a maximum value.

German Patent Publication No. 40 09 195 (which corresponds to U.S. Pat. No. 5,364,174). German Offenlegungsschrift 40 09 195 (U.S. Pat. No. 5,364,174) describes, for an antilock braking control system used in an all-wheel-drive vehicle, the creation of a reference speed required for traction control. In this context, the reference speed is essentially defined by the speed of the slowest wheel in the case of a speed increase, and by the speed of the third-fastest wheel in the case of a speed decrease. In the transition region between increase and decrease, the value attained by the slowest wheel speed is held constant. For the case where the speed of the third-fastest wheel deviates too greatly from an auxiliary reference speed, the reference speed is maintained concurrently with that auxiliary reference speed. The auxiliary reference speed is created by raising it by the speed of the third-fastest wheel, and decreasing it by the speed of the fastest wheel. It also is held constant in a transition region. If an instability exists due to incipient locking, the slope of the reference speed is defined by the slope of the auxiliary reference speed. If the wheels are slipping, the reference speed is held constant and the rise in the auxiliary reference speed is limited to a physically possible vehicle acceleration. If the rear wheels of the all-wheel-drive vehicle are decoupled from the drive system during braking, a slightly modified approach to creating the reference speed is used. Outside the control system, the reference speed is raised if the speeds of all the wheels are greater than it. If two or three wheels are faster than the reference speed, it is held constant. If none or only one of the wheels is faster than the reference speed, the reference speed is set downward.

Systems for controlling brake slip or traction are known in general form, for example from the book "Bremsanlagen für Kraftfahrzeuge" Braking systems for motor vehicles. Produced by Robert Bosch GmbH Stuttgart (VDI-Verlag, Dusseldorf, 1st edition 1994).

Systems for controlling a variable describing the dynamics of a vehicle are known, for example, from the publication "FDR—die Fahrdynamikregelung von Bosch" FDR—the Bosch vehcile dynamnics control system, which appeared in Automobiltechnische Zeitschrift (ATZ) 96, 1994, Vol. 11, pp. 674–689.

SUMMARY OF THE INVENTION

An object of the present invention is to improve the manner in which a variable describing the speed of a vehicle is determined.

SUMMARY OF THE INVENTION

One advantage of the method and the apparatus according to the present invention as compared to the references described above is that according to the present invention, the variable describing the speed of the vehicle can be determined for a vehicle driven in any fashion, i.e., for a vehicle with front-, all-, or rear-wheel drive, for any operating condition of the vehicle. The manner in which the variable describing vehicle speed is determined is, in this context, independent of whether a brake slip control system or a traction control system, or a system for controlling a variable describing the dynamics of the vehicle, which for example is at a higher level than the brake slip or traction control system, is implemented in the vehicle.

The variable describing the speed of the vehicle will hereinafter be referred to as the reference speed of the vehicle.

The method and apparatus according to the present invention are particularly advantageous for use in all-wheel-drive vehicles. In all-wheel-drive vehicles, it may happen under certain conditions, when drive is being applied, that the value of the reference speed of the vehicle that is determined is too high by comparison with the value of the actual speed of the vehicle. The method and the apparatus according to the present invention ensure that in these situations, the reference speed of the vehicle approaches the actual speed of the vehicle.

In the case of the method according to the present invention implemented in the apparatus according to the present invention, the reference speed of the vehicle is determined as a function of the speed of one selected wheel which is best suited for determination of the reference speed of the vehicle at that time and with the vehicle in that operating state. For selection of the wheel, on the one hand the operating state of the vehicle is determined; on the other hand, plausibility queries are performed as a function of the operating state of the vehicle.

Two plausibility queries have proven particularly advantageous in this connection, both of which are performed on the basis of the speeds of the wheels. On the basis of a first plausibility query, it is ascertained whether the reference speed of the vehicle can be determined as a function of a wheel whose speed is greater than the reference speed of the vehicle. On the basis of this first plausibility query, it is thus ascertained whether the reference speed of the vehicle must be supported upward, i.e., toward higher values. On the basis of a second plausibility query, it is ascertained whether the reference speed of the vehicle can be determined as a function of a wheel whose speed is less than the reference speed of the vehicle. On the basis of this second plausibility query, it is thus ascertained whether the reference speed of the vehicle must be supported downward, i.e., toward lower values.

Advantageously, on the basis of a third plausibility query it is ascertained whether the result of the first or the result of the second plausibility query is analyzed. For this purpose, the third plausibility query has at least two queries.

The first plausibility query has at least two queries. In each of these queries, a variable representing the speed difference of the two wheels is determined on the basis of the speed of two wheels. Advantageously, in a first query a first speed difference, which is constituted on the basis of the lowest and the highest wheel speed, and in a second query a second speed difference, which is determined from the lowest and the second-lowest wheel speed, are respectively compared to a threshold value. By way of these two queries, the synchronization of the speeds of the vehicle's wheels is determined.

Advantageously, the first plausibility query contains a third query. In this third query, a first variable describing the acceleration of the vehicle, which corresponds in particular to the drive shaft acceleration of the vehicle, is compared at least to a second variable describing the acceleration of the vehicle, which corresponds in particular to the longitudinal acceleration of the vehicle. In this context, the second variable can advantageously be corrected with the aid of an offset value which is determined as a function of a variable describing the state of the vehicle.

The second plausibility query, on the basis of which it is ascertained whether the variable representing the speed of the vehicle can be determined as a function of a wheel whose wheel velocity is less than the reference speed of the vehicle, has at least one query. In this query, a variable is compared to a pertinent threshold value, this variable being determined on the basis of the variables representing the slip values of the wheels. In this context, this variable is advantageously constituted as a function of a first variable which represents the sum of the individual slip values, and a second variable which represents the sum of the absolute values of the individual slip values.

A further advantage of the method and the apparatus according to the present invention is that proceeding from conventional slip or traction control systems, essentially no additional sensor technology is required. The method and apparatus according to the present invention can thus, in order to sense the wheel rotation speeds of the individual wheels, utilize the sensors present in any case in slip or traction control systems.

BRIEF DESCRIPTION OF THE DRAWINGS

FIG. 5 shows, in a time diagram, a fundamental problem avoided by the method and the apparatus according to the present invention.

DETAILED DESCRIPTION

Figure 1:
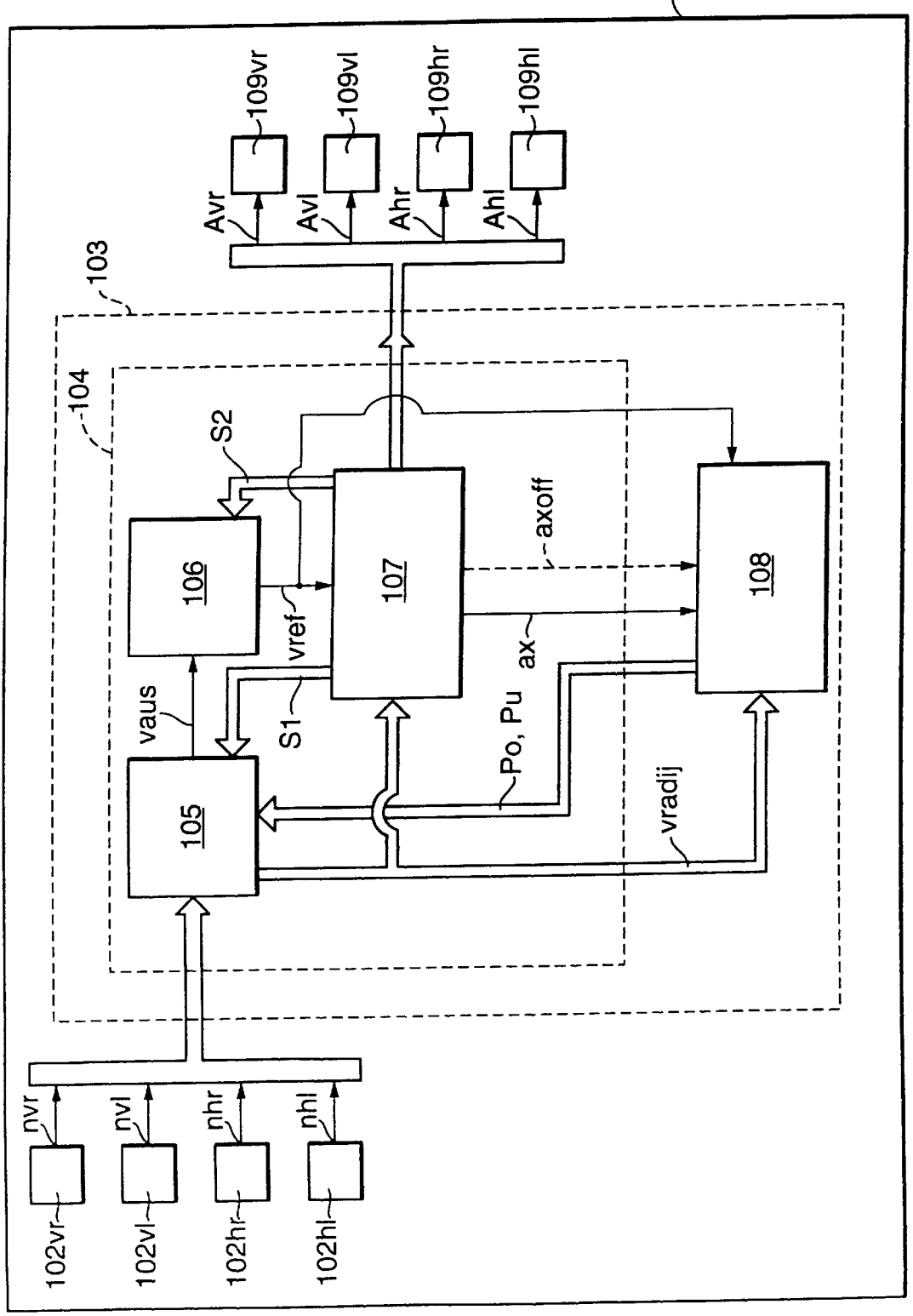
FIG. 1 shows a vehicle equipped with a traction control system in which an exemplary embodiment of the method and apparatus according to the present invention are implemented.

The present invention proceeds from conventional control systems with which, for example, the brake slip or traction of the wheels of a vehicle can be influenced. This is not, however, intended to constitute any limitation on the idea according to the present invention. The method and the apparatus according to the present invention can also be used in a system for controlling a variable describing the dynamics of the vehicle, in particular the yaw velocity of the vehicle. For this purpose, however, on the basis of FIG. 1, the vehicle must be equipped with additional sensor technology.

The problem involved in determining a variable describing the speed of a vehicle, which hereinafter will be referred to as the reference speed of the vehicle, will be discussed first. The reference speed vref of the vehicle is of particular significance in conjunction with traction control systems, since the activation signals for the brakes of the wheels or for the engine of the vehicle are determined on the basis of this variable.

Both in vehicles driven via a single axle and in all-wheel drive vehicles, the reference speed of the vehicle is determined from the wheel speeds of all four wheels of the vehicle. While in vehicles driven via a single axle, when drive is active the reference speed of the vehicle can be determined with little difficulty on the basis of the non-driven wheels of the vehicle, in the case of all-wheel-drive vehicles, determining the reference speed of the vehicle proves to be extremely complex in this situation due to coupling effects in the drive train.

Reference is made in this context to FIG. 5, which depicts an all-wheel-drive vehicle being actively driven. For this depiction, FIG. 5 contains the change over time in the speeds vradij of the wheels of an all-wheel-drive vehicle, the change over time in the reference speed vref of the vehicle, and the change over time in the actual speed vfz of the vehicle. FIG. 5 has two time phases. Phase 1 lasts from time t0 to time t1, and phase 2 lasts from time t1 to time t2. A brake actuation performed by the driver is assumed to be present at time t2.

In phase 1, the reference speed vref of the vehicle corresponds to the actual speed vfz of the vehicle. The slight oscillations present in the wheel velocities vradij do not cause any decoupling of the reference speed vref from the actual speed vfz.

At the beginning of phase 2, an overvaluation of the reference speed vref as compared to the actual speed vfz of the vehicle is evident as a result of coupling effects in the drive train, i.e., the reference speed vref is greater than the actual speed vfz. The overvaluation of the reference speed vref of the vehicle means that slipping wheels, for example, are recognized too late, which as phase 2 continues leads to drive train oscillations which are depicted as severe oscillations of the wheel speed vradij. These severe oscillations in the wheel speeds vradij lead to a complete decoupling between the reference speed vref and the actual speed vfz of the vehicle.

Because of this complete decoupling, the brake actuation indicated in FIG. 5 can immediately cause an ABS control action, even through an ABS control action would not be necessary, or at least not immediately necessary, based on the actual speed vfz of the vehicle.

With the aid of the method and apparatus according to the present invention, the determination of the reference speed of the vehicle is improved, at least for the instance in which an all-wheel-drive vehicle is being actively driven, in such a way that the severe oscillations in the wheel speeds vradij depicted in phase 2 are avoided, for which purpose there is no decoupling between the reference speed vref and actual speed vfz of the vehicle. The improvement is achieved in that the reference speed vref is correspondingly supported as a function of the result of at least two plausibility queries.

The method and the apparatus according to the present invention are usable for any type of slip or traction control system that is used in a vehicle, and for any type of vehicle drive concept.

In FIG. 1, block 101 indicates a vehicle. Vehicle 101 contains a block 103 which represents the control device of the control system implemented in the vehicle. The control system implemented in the vehicle can be a system for controlling brake slip and/or a system for controlling traction and/or a system for controlling a variable describing the dynamics of the vehicle.

Control device 103 contains a controller 104 and a block 108 in which the method according to the present invention is carried out. Both blocks will be additionally described below.

Vehicle 101 furthermore contains means 102$vr$, 102$vl$, 102$hr$, and 102$hl$ with which the variables describing the speeds of the wheels are sensed. These means are, in particular, wheel rotation speed sensors. The wheels to which the wheel rotation speeds are allocated are not depicted in FIG. 1. Hereinafter the simplifying notation 102$ij$ will be introduced for the wheel rotation speed sensors. In this context, the index i indicates whether the wheel is located on the rear axle (h) or front axle (v), and the index j indicates the allocation to the right (r) or left (l) side of the vehicle. This identification by way of the two indices i and j is analogous for all variables or components to which it is applied.

The signals nij generated by wheel rotation speed sensors 102$ij$ are conveyed to a block 105 contained in controller 104. In addition to signals nij, block 105 receives variables Po and Pu proceeding from block 108, and signals S1 proceeding from a block 107.

On the one hand, block 105 generates from signals nij the wheel speeds vradij which are conveyed to blocks 107 and 108. Also in block 105, on the basis of variables Po and Pu and on the basis of signals S1, a wheel is selected whose wheel speed vaus is conveyed to a block 106. Selection of the wheel in block 105 proceeds, for example, as follows: First an operating state of the vehicle is determined on the basis of signals S1. For this, a distinction can be made, for example as a function of a variable which is contained in signals S1 and describes the acceleration of the vehicle, between an operating state in which the vehicle is being braked, and an operating state in which the vehicle is being accelerated. As a function of the operating state of the vehicle that is determined, plausibility queries are used to select a wheel. This wheel is the one best suited, at that time and with the vehicle in that operating state, for determining the reference speed of the vehicle. At least the two variables Po and Pu, as well as signals and variables contained in signals S1, are involved in the plausibility queries.

The signals contained in signals S1 are, for example, signals which deliver a datum as to whether an action of the implemented slip or traction control system is present for the time step in question, or signals which indicate the number of wheels being controlled. They also contain, for example, a variable which describes the acceleration behavior of the vehicle, in particular as to whether the vehicle is in a transition deceleration and acceleration, or variables which describe the skewing of individual wheels. Other signals or variables in addition to those set forth can also be contained in signals S1.

The speed vaus of the wheel selected in block 105 is conveyed to a block 106. In this block, on the basis of this speed vaus, a variable describing the speed of the vehicle (the reference speed vref of the vehicle) is determined. This reference speed vref is conveyed both to block 107 and to block 108. In addition to the speed vaus, further variables S2, which are conveyed to block 106 from block 107, are also involved in the determination of the reference speed vref. These variables S2 are, for example, a variable describing the acceleration of the vehicle, and at least one factor which defines the degree to which the speed vaus of the selected wheel is involved in the determination of the reference speed vref.

Block 107 is the controller core of control device 104. Controller core 107 performs several functions. On the one hand, controller core 107 determines, at least on the basis of the wheel speeds vradij conveyed to it and the reference speed vref of the vehicle, and in accordance with the control system implemented in the control device, activation signals Aij for actuators 109ij allocated to the wheels of the vehicle, with which the braking torques acting on the individual wheels can be established. Actuators 109ij are, for example, valves for modulating the wheel brake cylinder pressure. In the case of systems for controlling traction, it is also possible to output a signal with which the drive torque delivered by the engine of the vehicle can be influenced. The engine is not depicted in FIG. 1.

In systems for controlling brake slip, in order control the brake slip it is conventional to vary the braking torques acting on the individual wheels by actuating the brakes. In systems for controlling traction, it is conventional to establish the traction of the wheels by generating a braking torque for individual wheels or by influencing the drive torque delivered by the engine. In systems for controlling brake slip and/or traction, the same applies in terms of establishing the corresponding slip values. In systems for controlling a variable describing the dynamics of a vehicle, the braking torques necessary in order to control the corresponding slip can usually be established individually for the corresponding wheels, independently of the driver. In supplementary fashion, the drive torque delivered by the engine is influenced, for example in the context of a drive torque control system.

The previously mentioned signals S1 and S2 are also determined in block 107. At least the wheel speeds vradij are involved in the determination of signals S1 and S2. In addition, a variable ax which represents the acceleration of the vehicle is determined in block 107. This variable is, in particular, the longitudinal acceleration of the vehicle. The variable ax is determined, for example, on the basis of the wheel speeds vradij. It is also conceivable, however, to sense this variable with the aid of a suitable sensor, or to determine it using a mathematical model. The variable ax is conveyed to block 108 for further processing.

If necessary for further processing in block 108, a further variable axoff, which is conveyed to block 108 if required, is determined in block 107. The variable axoff represents an offset value with respect to the variable ax which describes acceleration. In this context, in block 107 the value of the variable axoff is determined as a function of a variable describing the state of the vehicle, for example the reference speed vref of the vehicle.

The method according to the present invention is executed in block 108. On the basis at least of the wheel speeds vradij, the reference speed vref of the vehicle, and the variable ax describing the acceleration of the vehicle, and the pertinent offset value axoff if necessary, the two variables Po and Pu are determined in block 108 on the basis of a first or second plausibility query, and are conveyed to block 105. The determination of the two variables Po and Pu will be discussed in detail in conjunction with FIGS. 2, 3, and 4.

The sensor technology described above in conjunction with FIG. 1 represents the sensor technology that may be necessary in terms of the method and the apparatus according to the present invention. If the vehicle is equipped with a system for controlling brake slip or a system for controlling traction, wheel rotation sensors 102ij are already present because of these systems. If the vehicle is equipped with a system for controlling a variable representing the dynamics of the vehicle, in particular the yaw velocity of the vehicle, then proceeding from the sensors depicted in FIG. 1, at least one rotation rate sensor or yaw rate sensor, and/or a transverse acceleration sensor, as well as a steering angle sensor, also may be necessary.

The utilization of the method and apparatus according to the present invention indicated in the exemplary embodiment is not intended to represent any limitation. It is also conceivable to utilize the method and apparatus according to the present invention in other systems in which a variable describing the speed of the vehicle is also necessary.

Figure 2:
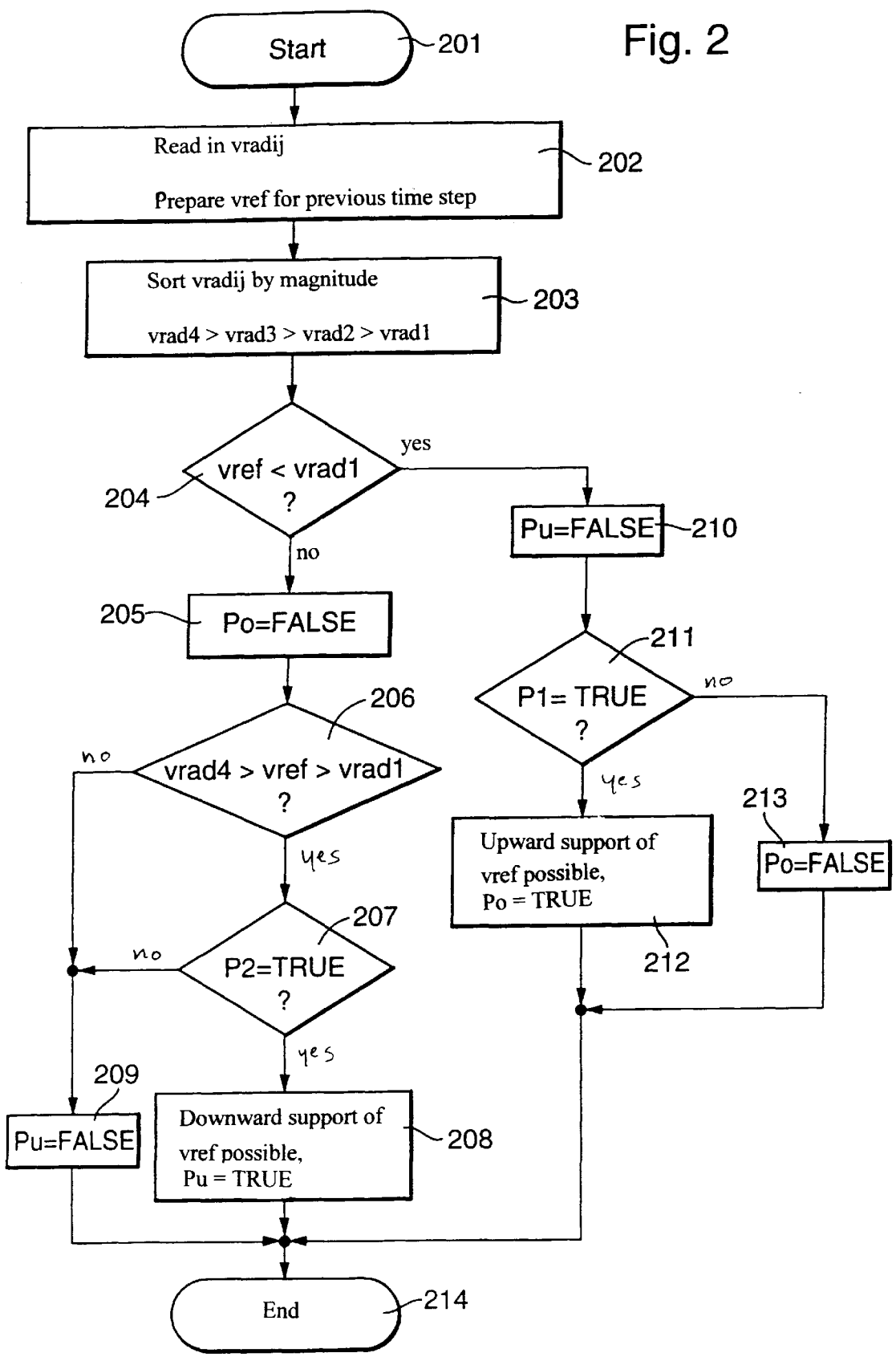
FIG. 2 shows steps of an exemplary embodiment of the method according to the present invention.

FIG. 2 depicts, with the aid of a flow chart, the execution of the method according to the present invention. With the method according to the present invention depicted in FIG. 2, on the basis of a value for the reference speed vref of the vehicle for example for the previous time step, plausibility queries are used draw a conclusion for determining the reference speed vref of, for example, the current time step. What is ascertained in this context is whether it is possible to support the reference speed vref of the vehicle upward or downward. Indication of the respective time step will hereinafter be almost entirely omitted.

As an alternative to the allocation of time steps described above, it is also conceivable, on the basis of a value for the reference speed vref for the current time step, to draw a conclusion as to the reference speed vref for the subsequent time step.

The method according to the present invention begins with a step 201. Following step 201, a step 202 is executed in which the wheel speeds vradij of the current time step are read in. Also in step 202, the reference speed vref of the previous time step is prepared.

Subsequent to step 202, a step 203 is executed. In this step the wheel speeds vradij are sorted by magnitude. For the wheel speeds vradij sorted by magnitude, the following allocation, for example, apply: The speed of the slowest wheel, i.e. the smallest wheel speed vradij, is allocated to the variable vrad1. The speed of the second-slowest wheel is allocated to the variable vrad2, the speed of the second-fastest to the variable vrad3, and the speed of the fastest wheel, i.e. the greatest wheel speed vradij, to the variable vrad4. This allocation may be expressed by the relationship vrad1 < vrad2 < vrad3 < vrad4.

Subsequent to step 203, a step 204 is executed. In this step the value of the reference speed vref is compared to the value of the wheel speed vrad1, i.e. to the lowest wheel speed. If it is ascertained in this query that the value of the reference speed vref is greater than the value of the wheel speed vrad1, then a step 205 is performed subsequent to step 204.

In step 205, the value FALSE is assigned to a variable Po. With variable Po, block 105 is informed whether or not an upward support of the reference speed vref is possible. The value FALSE is assigned to the variable Po in step 205 because it was ascertained in step 204 that the value of the reference speed vref is greater than the value of the wheel speed vrad1, and for that reason an upward support of the reference speed vref is probably not necessary.

Subsequent to step 205, a step 206 is executed. In this step a query takes place in which the value of the reference speed vref is compared to the value of the wheel speed vrad4 (the highest wheel speed), and to the value of the wheel speed vrad1 (the lowest wheel speed). If it is ascertained in this query that the value of the reference speed vref is less than the value of the wheel speed vrad4 and greater than the value of the wheel speed vrad1, then a step 207 is performed subsequent to step 206. In step 207, the value of the variable P2 is queried. If the variable P2 has the value TRUE, then a step 208 is performed after step 207.

If it is ascertained in step 207 that the variable P2 has the value TRUE, then a downward support of the reference speed vref of the vehicle is possible. The value TRUE is consequently assigned to the variable Pu in step 208. By way of this assignment, block 105 receives the information that a wheel whose wheel speed is less than the reference speed vref can be selected. In block 106, the reference speed vref is therefore determined as a function of a wheel whose wheel speed is lower than the reference speed. After step 208, step 214 is executed. Step 214 terminates the method according to the present invention depicted in FIG. 2.

If it is ascertained in step 207, however, that the variable P2 does not have the value TRUE, then a step 209 is performed subsequent to step 207. Since the variable P2 does not have the value TRUE, a downward support of the reference speed vref is not possible, and consequently in step 207 the value FALSE is assigned to the variable Pu. Step 214 is performed subsequent to step 209.

If it is ascertained in step 206 that the value of the reference speed vref does not meet the condition described by the expression vrad4 >vref >vrad1, then step 209 (described above) is performed subsequent to step 206.

If it is ascertained in the query taking place in step 204 that the value of the reference speed vref is less than the value of the wheel speed vrad1, then a step 210 is performed after step 204. In this step, the value FALSE is assigned to the variable Pu, since on the basis of the vehicle state that is present, as represented on the basis of the result of the query in step 204, it is not possible to support the reference speed vref downward. In this instance it is advisable to support the reference speed vref upward.

Step 210 is followed by a step 211. In this step, the value of the variable P1 is queried. If it is ascertained in step 211 that the variable P1 has the value TRUE, which signifies that an upward support of the reference speed is possible, then a step 212 is performed subsequent to step 211. In step 212, the value TRUE is assigned to the variable Po. By way of this assignment, block 105 receives the information that a wheel whose wheel speed is greater than the reference speed vref can be selected. The reference speed vref is thus determined in block 106 as a function of a wheel whose wheel speed is greater than the reference speed. Step 214 is performed after step 212.

If, on the other hand, it is ascertained in step 211 that the variable PI does not have the value TRUE, then subsequent to step 211 a step 213 is performed, in which the value FALSE is assigned to the variable Po. Step 214 is performed subsequent to step 213.

In conclusion, the queries performed in steps 204 and 205 together constitute a plausibility query. In addition, the method depicted in FIG. 2 executes continuously in the background of the slip or traction control system implemented in the vehicle.

FIG. 2 also shows that the result of the first plausibility query is analyzed if it is ascertained in a first query that the reference speed of the vehicle is lower than the lowest wheel speed. The result of the second plausibility query is analyzed if it is ascertained in a second query that the reference speed of the vehicle is greater than the lowest and less than the highest wheel speed. In other words, the result of the first plausibility query, which ascertains whether the reference speed of the vehicle can be determined as a function of a wheel whose speed is greater than the reference speed of the vehicle, is analyzed if the reference speed of the vehicle is less than the lowest wheel speed, since in that case an upward support is probably advisable. Correspondingly, the result of the second plausibility query is analyzed if the reference speed of the vehicle is greater than the lowest and less than the highest wheel speed, since in that case a downward support of the reference speed of the vehicle is probably advisable. Subsequently, with the aid of the third plausibility query and in accordance with the operating state of the vehicle described by the wheel speeds of the vehicle, the appropriate plausibility query is selected and the result of the appropriate plausibility query is analyzed.

Figure 3:
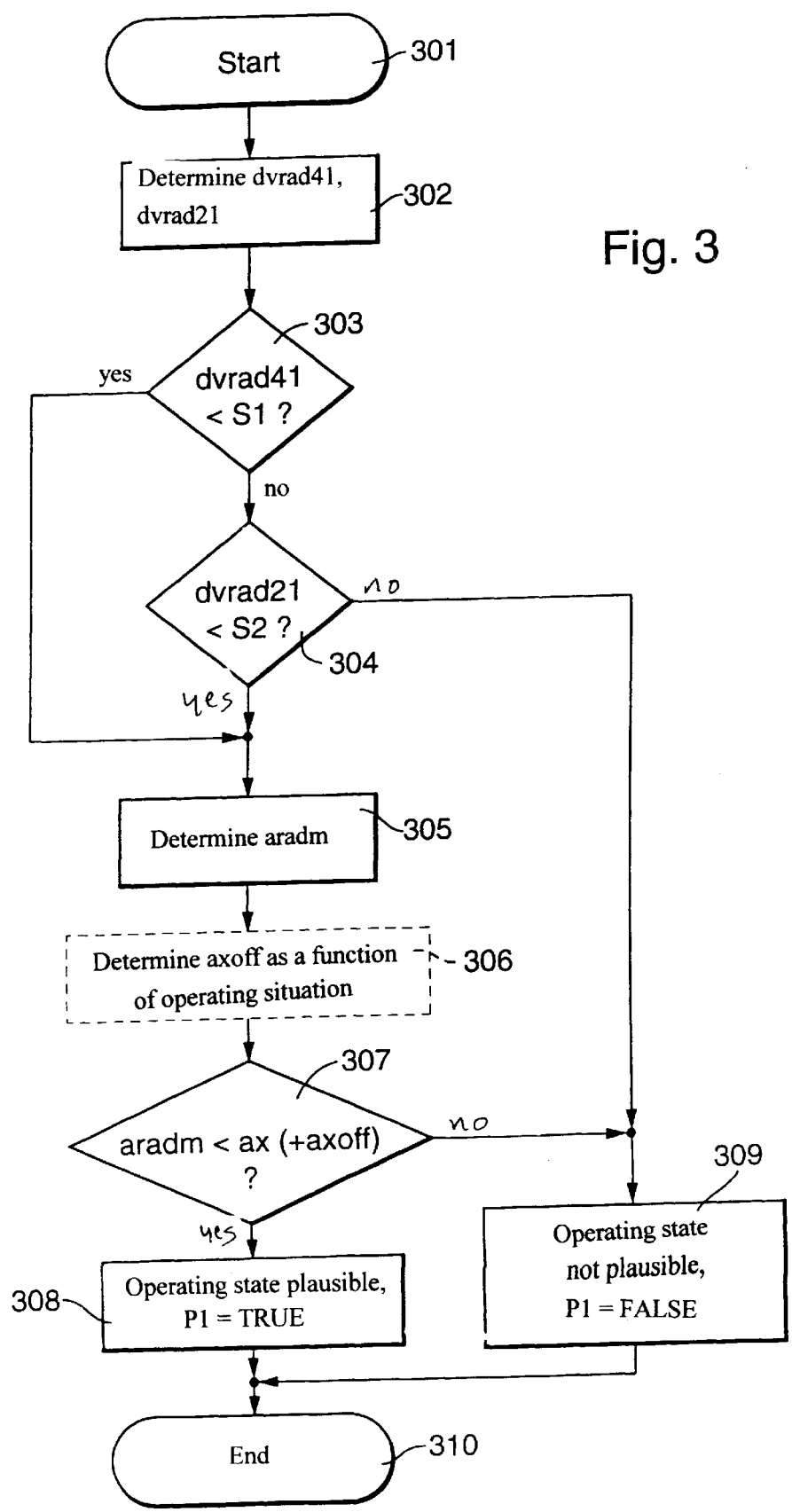
FIG. 3 shows further steps of the exemplary embodiment of the method according to the present invention.

FIG. 3 depicts, with the aid of a flow chart, a first plausibility query on the basis of which it is ascertained whether the reference speed vref of the vehicle can be supported upward, i.e. whether the reference speed vref of the vehicle can be determined as a function of a wheel whose wheel speed is greater than the reference speed vref of the vehicle. The result of the plausibility query depicted in FIG. 3 is output with the aid of the variable P1. This variable, as already shown in connection with FIG. 2, is analyzed by way of the query taking place in step 209 in order to forward the corresponding information to block 105.

Figure 4:
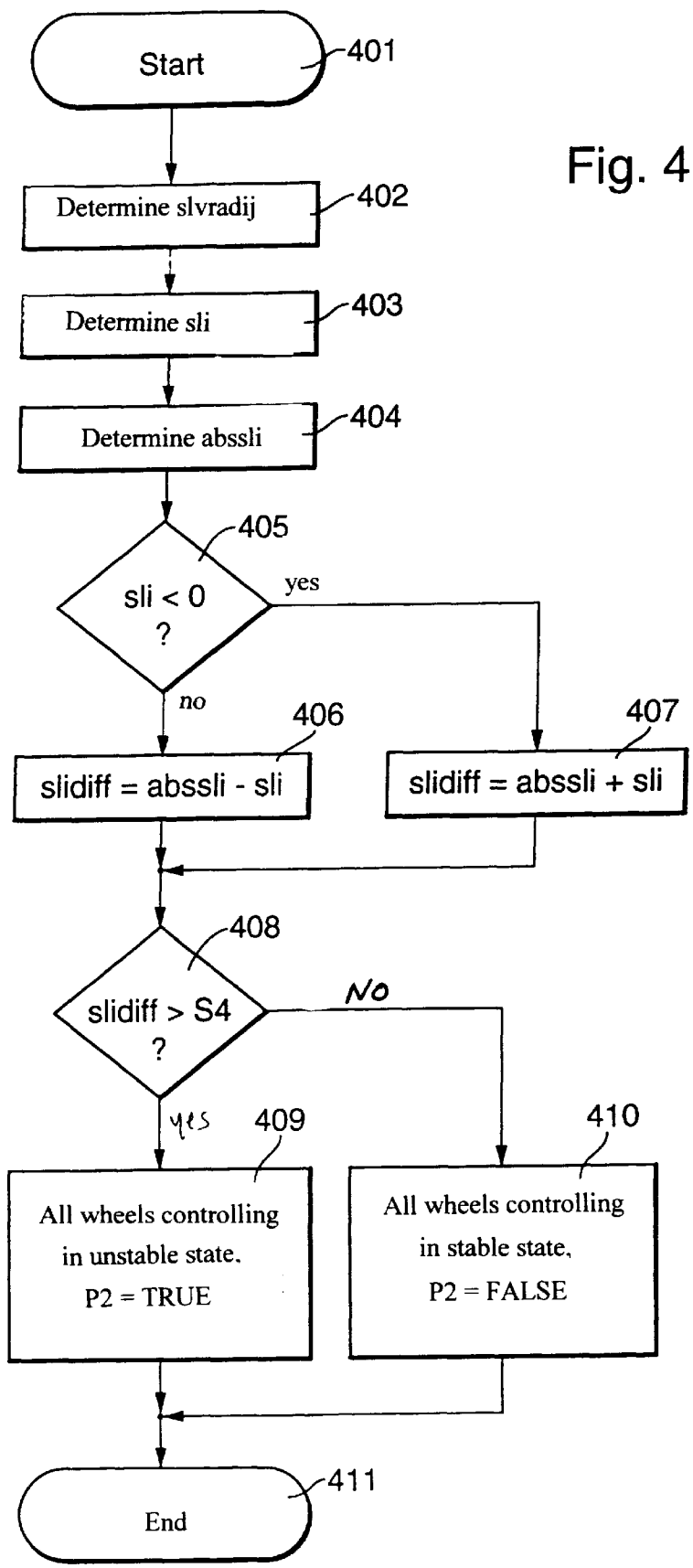
FIG. 4 shows further steps of the exemplary embodiment of the method according to the present invention.

The exemplary embodiment described in the present application was selected so that both the first plausibility query depicted in FIG. 3 and the second plausibility query depicted in FIG. 4 execute in the background of the control system implemented in the vehicle. With the aid of the third plausibility query shown in FIG. 2, it is ascertained whether the result of the first or the result of the second plausibility query is analyzed. It is also conceivable, however, to carry out the method according to the present invention in such a way that the first or the second plausibility query is only performed later, as a function of the result of the third plausibility query.

The first plausibility query depicted in FIG. 3 begins with a step 301. Step 301 is followed by a step 302. In this step, two speed differences are determined, each on the basis of two wheel speeds. A first speed difference dvrad41 is constituted on the basis of the lowest wheel speed vrad1 and the highest wheel speed vrad4. A second speed difference dvrad21 is constituted on the basis of the lowest and the second-lowest wheel speed.

Step 302 is followed by a step 303 in which a first query is performed. In this first query, the first speed difference dvrad41 is compared to a first threshold S1. If it is ascertained in the query taking place in step 303 that the first speed difference dvrad41 is not less than the first threshold value S1, then a step 304 is performed subsequent to step 303. In step 304, in a second query the second speed difference dvrad21 is compared to a second threshold value S2.

If it is ascertained in this second query that the second speed difference dvrad21 is less than the second threshold value S2, then a step 305 is performed subsequent to step 304.

If it is ascertained in step 303 that the first speed difference dvrad41 is less than the first threshold value S1, then step 305 is performed subsequent to step 303. If it is ascertained in step 304 that the second speed difference dvrad21 is not less than the second threshold value S2, then a step 309, described below, is performed subsequent to step 304.

In step 305, a further variable aradm describing the acceleration of the vehicle is determined. This variable is, for example, the drive shaft acceleration of the vehicle. It is determined, for example on the basis of the wheel speed vradij, by taking the average and the derivative over time. Filtration of the variable aradm is also a possibility in this context.

According to the depiction in FIG. 3, a step 306 follows step 305. The depiction of step 306 with dashed lines is intended to express the fact that the determination of a variable axoff taking place in step 306 is optional, and is not absolutely necessary for carrying out the method according to the present invention. The variable axoff represents an offset value with respect to the variable ax describing the acceleration of the vehicle, and, as will be described below, is optionally involved in the comparison taking place in a step 307.

If the offset value axoff with respect to the variable ax is to be taken into consideration, then subsequent to step 305, step 306 is performed and is followed by step 307. If the offset value axoff with respect to the variable ax is not to be taken into consideration, then step 306 is not performed, and step 305 is followed directly by step 307.

The offset value axoff is determined in step 306 as a function of the vehicle situation, or as a function of the operating state of the vehicle. A variable describing the state of the vehicle is used to determine the operating state of the vehicle. For example, the offset value axoff can be determined as a function of the reference speed vref of the vehicle.

In step 307, a third query for the first plausibility query takes place. If the offset value axoff described above is not to be taken into consideration, then in this third query the first variable aradm describing the acceleration of the vehicle is compared to the second variable ax describing the acceleration of the vehicle. If the offset value axoff is also to be taken into consideration, then in the third query the variable aradm is compared to a sum formed from the variable ax and the offset value axoff. The optional consideration of the offset value axoff in step 307 is indicated in FIG. 3 by the parentheses around the expression "+axoff".

If it is ascertained in Step 307 that the variable aradm describing the acceleration of the vehicle is less than the corresponding comparison value—which, considering the first, second, and third queries synoptically, signifies that the operating state of the vehicle is plausible—then a step 308 is performed after step 307. Since the operating state of the vehicle is plausible, the value TRUE is assigned to the variable P1 in step 308. As a result, as already described above, the reference speed vref of the vehicle can be determined as a function of a wheel whose speed is greater than the reference speed vref. Subsequent to step 308, a step 310 is performed, terminating the first plausibility query.

If, on the other hand, it is ascertained in step 307 that the variable aradm describing the acceleration of the vehicle is not less than the corresponding comparison value—which, considering the first, second, and third queries synoptically, signifies that the operating state of the vehicle is not plausible—then step 309 is performed subsequent to step 307. In this step, the value FALSE is assigned to the variable 309. Step 309 is then followed by step 310.

In summary, the following may be stated with regard to the first plausibility query depicted in FIG. 3: On the basis of the first plausibility query, the reference speed of the vehicle is determined as a function of a wheel whose speed is greater than the reference speed of the vehicle if it is ascertained in the first query that the first speed difference dvrad4l is less than the first threshold value S1, and/or if it is ascertained in the second query that the second speed difference dvrad2l is less than the second threshold value S2, and if it is ascertained in the third query that the first variable aradm describing the acceleration of the vehicle is less than the corresponding comparison value.

FIG. 4 depicts, with the aid of a flow chart, the second plausibility query on the basis of which it is ascertained whether the reference speed vref of the vehicle can be supported downward, i.e. whether the reference speed vref of the vehicle can be determined as a function of a wheel whose wheel speed is less than the reference speed vref of the vehicle. The result of the plausibility query depicted in FIG. 3 is output via the variable P2. This variable, as already shown in connection with FIG. 2, is analyzed by way of the query taking place in step 206 in order to forward the corresponding information to block 105.

The second plausibility query begins with a step 401. Subsequent to step 401, a step 402 is performed. In this step, on the basis of the wheel speeds vradij, a variable slvradij representing the slip of the respective wheel, which in particular corresponds to the slip value of the respective wheel, is determined. Subsequent to step 402, a step 403 is performed. In this step, a first variable sli is constituted on the basis of the variables slvradij. This first variable sli is produced by obtaining the sum of the individual slip values slvradij, and thus describes the summed slip.

After step 403, a step 404 is performed in which a second variable abssli is constituted on the basis of the variables slvradij. This second variable abssli is produced by obtaining the sum of the absolute values of the individual slip values slvradij, and thus describes the absolute slip. Subsequent to step 404, a step 405 is performed. In this step, the sign of the first variable sli is determined with the aid of a query.

If it is ascertained in this query that the first variable sli is greater than zero, i.e., is positive, then step 406 is executed as the next step. In this step, a difference slidiff is constituted on the basis of the first variable sli and the second variable abssli. This difference describes the deviation of the total slip sli from the absolute slip abssli. Subsequent to step 406, a step 408 is performed. If, on the other hand, it is ascertained in the query taking place in step 405 that the first variable sli is less than zero, i.e., is negative, then a step 407 is performed subsequent to step 405. In step 407, a sum slidiff is constituted on the basis of the first variable sli and the second variable abssli. Because the first variable is negative, this sum also describes the deviation of the summed slip sli from the absolute slip abssli. Subsequent to step 407, step 408 is performed.

In step 408, the variable slidiff constituted in step 406 or in step 407 is compared, by way of a query, to a pertinent threshold value S4. If it is ascertained in this query that the variable slidiff is greater than the pertinent threshold value, which signifies that all wheels are controlling in the unstable state, then subsequent to step 408 a step 409 is performed, in which the value TRUE is assigned to the variable P2. As a result, as already described above, it is possible to determine the reference speed vref of the vehicle as a function of a wheel whose speed is less than the reference speed vref. The variable slidiff is, for example for the phase 2 contained in FIG. 5, greater than the pertinent threshold value S4, since the reference speed vref of the vehicle is too high as compared with the actual speed vfz of the vehicle. For this reason, a downward correction, i.e., support, of the reference speed is necessary.

If, on the other hand, it is ascertained in the query in step 408 that the variable slidiff is less than the pertinent threshold value S4, which signifies that all wheels are controlling in the stable state, then step 410, in which a value of FALSE is assigned to the variable P2, is performed subsequent to step 408. The vehicle state ascertained in this case corresponds, for example, to that in phase 1 of FIG. 5. In this phase the reference speed vref corresponds to the actual speed vfz of the vehicle, so that no correction is necessary. For this reason there is also no need for a downward support of the reference speed vref, so that the value FALSE is assigned to the variable P2.

Both subsequent to step 409 and subsequent to step 410, a step 411 is performed which terminates the second plausibility query.

In summary, the following may be stated with regard to the second plausibility query depicted in FIG. 3: On the basis of the second plausibility query, the reference speed of the vehicle is determined as a function of a wheel whose speed is less than the reference speed of the vehicle, if it is ascertained in the query that the difference or sum slidiff is greater than the pertinent threshold value.

In conclusion, the depiction of the apparatus and method according to the present invention selected in the drawings is not intended to represent any limitation on the essential idea of the present invention.

What is claimed is:

1. A method of determining a vehicle speed variable describing a speed of the vehicle, the vehicle including pertinent wheels, comprising the steps of:

determining quantities describing speeds of the pertinent wheels;

determining wheel speeds of the pertinent wheels as a function of the quantities;

performing at least a first plausibility query and a second plausibility query, each of the first plausibility query and the second plausibility query being performed as a function of the wheel speeds;

determining, at least on the basis of the first plausibility query, if the vehicle speed variable can be determined as a function of a first one of the wheel speeds, the first one of the wheel speeds being greater than a reference vehicle speed variable;

determining, at least on the basis of the second plausibility query, if the vehicle speed variable can be determined as a function of a second one of the wheel speeds, the second one of the wheel speeds being less than the reference vehicle speed variable;

selecting one of the pertinent wheels as a function of at least one of a first result of the first plausibility query and a second result the second plausibility query; and determining the vehicle speed variable as a function of a wheel speed of the selected one of the pertinent wheels.

2. The method according to claim 1, further comprising the steps of:

performing a third plausibility query and determining, on the basis of the third plausibility query, which one of the first result and the second result to analyze, the third plausibility query including at least two queries, at least one of the at least two queries including the step of comparing the reference vehicle speed variable to a wheel speed of at least one of the pertinent wheels.

3. The method according to claim 2, wherein the wheel speeds are sorted by magnitude, further comprising the steps of:

analyzing the first result of the first plausibility query if the reference speed variable is less than a lowest one of the wheel speeds; and analyzing the second result of the second plausibility query if the reference speed variable is greater than the lowest one of the wheel speeds and less than a highest one of the wheel speeds.

4. The method according to claim 1, wherein the first plausibility query includes at least two queries, in each of the two queries, a difference between a wheel speed of a first one of the pertinent wheels and a wheel speed of a second one of the pertinent wheels is compared a pertinent threshold value.

5. The method according to claim 4, wherein the wheel speeds are sorted by magnitude, and wherein the first query of the first plausibility query includes the step of comparing a first difference variable to a first threshold value, the first difference value determined as a function of a lowest one of the wheel speeds and a highest one of the vehicle speeds, and the second query of the first plausibility query includes the step of comparing a second difference variable to a second threshold value, the second difference value determined as a function of the lowest one of the wheel speeds and a second-lowest one of the wheel speeds.

6. The method according to claim 5, wherein the first plausibility query includes a third query, the third query including the steps of comparing a first acceleration variable describing an acceleration of the vehicle to at least a second acceleration variable describing the acceleration of the vehicle, the second acceleration variable being correctable using an offset value, the offset value being determined as a function of a state variable describing a state of the vehicle.

7. The method according to claim 6, wherein on the basis of the first plausibility query, the vehicle speed variable can be determined as a function of a first one of the pertinent wheels if i) one of the first difference variable is less than the first threshold value, and the second difference variable is less than the second threshold value, and ii) the first acceleration variable is less than the second acceleration variable, a wheel speed of the first one of the pertinent wheels being greater than the reference vehicle speed variable.

8. The method according to claim 4, wherein the first plausibility query includes a third query, the third query including the steps of comparing a first acceleration variable describing an acceleration of the vehicle to at least a second acceleration variable describing the acceleration of the vehicle, the second acceleration variable being correctable using an offset value, the offset value being determined as a function of a state variable describing a state of the vehicle.

9. The method according to claim 1, further comprising the step of:

determining slip variables representing slip values of the pertinent wheels as a function of the wheel speeds, wherein the second plausibility query includes at least one query, the at least one query of the second plausibility query including a comparison with a pertinent threshold value, the comparison being performed at least on the basis of the slip variables.

10. The method according to claim 9, further comprising the steps of:

determining a first sum value, the first sum value being a sum of the slip values;

determining a second sum value, the second sum value being a sum of absolute values of the slip values; and determining the vehicle speed variable on the basis of results of the second plausibility query if one of a difference and sum of the first sum value and the second sum value is greater than the pertinent threshold value.

11. An apparatus for determining a vehicle speed variable describing a speed of a vehicle, comprising:

a first arrangement determining respective wheel speed quantities describing speeds of pertinent wheels of the vehicle;

a second arrangement determining wheel speeds as a function of the wheel speed quantities and selecting one of the pertinent wheels as a function of the wheel speeds;

a third arrangement determining the vehicle speed variable as a function of the selected one of the pertinent wheels; and a fourth arrangement performing a first plausibility query and a second plausibility query, each of the first plausibility query and the second plausibility query being performed as a function of the wheel speeds, the fourth means determining, on the basis of the first plausibility query, if the vehicle speed variable can be determined as a function of a first one of the pertinent wheels, the first one of the pertinent wheels having a wheel speed greater than a reference vehicle speed variable, and determining, on the basis of the second plausibility query, if the vehicle speed variable can be determined as a function of a second one of the pertinent wheels, the second one of the pertinent wheels having a wheel speed that is less than the reference vehicle speed variable, wherein the second arrangement selects the one of the pertinent wheels as a function of the first result and the second result.

12. The method according to claim 1, wherein:

the first plausibility query determines whether an operating state of the vehicle is plausible; and the second plausibility query determines whether all of the pertinent wheels are controlling in an unstable state.

* * * * *